(12) United States Patent
Merino et al.

(10) Patent No.: US 10,513,227 B2
(45) Date of Patent: Dec. 24, 2019

(54) PICKUP TRUCK HAVING CARGO BED WITH SIDE MOUNTED BICYCLE RACK

(71) Applicant: FORD GLOBAL TECHNOLOGIES, LLC, Dearborn, MI (US)

(72) Inventors: Carlos Emilio Merino, Mexico City (MX); Jonatan Leff Yaffe, Mexico City (MX); Pedro Montoya, Mexico City (MX); Iuis Manuel Garcia, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 15/298,355

(22) Filed: Oct. 20, 2016

(65) Prior Publication Data
US 2018/0111564 A1    Apr. 26, 2018

(51) Int. Cl.
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .. B60R 9/06; B60R 9/10; B60R 11/00; B60R 9/08; B60P 3/122; B60P 3/079; B62H 3/00; B62H 3/12
USPC .... 224/403, 402, 405, 924, 282; 211/17, 18, 211/19, 20, 21, 22, 86.01, 87.01, 94.01; 248/124.1, 125.9, 202.1, 214, 282.1, 248/287.1, 298.1, 295.11; 296/37.6
See application file for complete search history.

(56) References Cited

U.S. PATENT DOCUMENTS

| | | | | |
|---|---|---|---|---|
| 4,057,182 A | * | 11/1977 | Kolkhorst | B60R 9/10 211/18 |
| 4,700,845 A | * | 10/1987 | Fretter | B62H 3/12 211/17 |
| 4,934,572 A | | 6/1990 | Bowman et al. | |
| 4,976,386 A | * | 12/1990 | Geiger | B60R 9/06 224/401 |
| 5,037,019 A | * | 8/1991 | Sokn | B60R 9/00 224/403 |
| 5,078,276 A | * | 1/1992 | Rogge | B62H 3/12 211/18 |
| 5,127,564 A | | 7/1992 | Romero | |

(Continued)

OTHER PUBLICATIONS

DG Manufacturing, "Bicycle Support Instructions—Drawing Fig 4,5,6,7" "http://www.discountramps.com/images/art/truck-bed-bicycle-support-instructions.pdf".

(Continued)

*Primary Examiner* — Nathan J Newhouse
*Assistant Examiner* — Lester L Vanterpool
(74) *Attorney, Agent, or Firm* — Jason Rogers; Vichit Chea; King & Schickli, PLLC

(57) ABSTRACT

An apparatus for supporting a bicycle having wheels and a frame relative to a cargo bed of a pickup truck having a tailgate, spaced sidewalls and a front wall. The apparatus comprises a carrier adapted for receiving and supporting the bicycle frame and a guide for mounting to the sidewall for guiding movement of the carrier in the travel direction. The guide may comprise parallel rails for slidably engaging a connector of the carrier. The carrier may be adapted for moving, such as by pivoting, between a stowed position aligned with the travel direction and an extended position transverse to the travel direction.

12 Claims, 5 Drawing Sheets

(56) References Cited

U.S. PATENT DOCUMENTS

| | | | | |
|---|---|---|---|---|
| 5,255,951 | A | * | 10/1993 | Moore, III ............... B60R 9/02 224/405 |
| 5,257,728 | A | | 11/1993 | Gibson |
| 5,427,286 | A | * | 6/1995 | Hagerty ................... B60R 9/00 211/18 |
| 5,445,300 | A | * | 8/1995 | Eipper ..................... B60R 9/06 224/496 |
| 5,611,472 | A | | 3/1997 | Miller |
| 5,709,521 | A | | 1/1998 | Glass et al. |
| 5,794,828 | A | | 8/1998 | Colan et al. |
| 5,836,490 | A | * | 11/1998 | Price ........................ B60R 9/00 224/403 |
| 6,149,039 | A | * | 11/2000 | Englander ............... B60R 9/042 224/310 |
| 6,179,181 | B1 | | 1/2001 | Johnson et al. |
| 6,382,480 | B1 | * | 5/2002 | Egly ......................... B60R 5/00 224/310 |
| 6,547,115 | B1 | | 4/2003 | Kato et al. |
| 6,679,408 | B1 | | 1/2004 | Thomas et al. |
| 6,698,810 | B1 | * | 3/2004 | Lane ........................ B60P 3/40 296/26.02 |
| 6,722,541 | B1 | | 4/2004 | Aftanas .................... B60R 9/00 224/321 |
| 6,846,140 | B2 | * | 1/2005 | Anderson ............ B60P 7/0815 410/102 |
| 7,165,704 | B2 | | 1/2007 | Lo |
| 7,641,086 | B2 | | 1/2010 | Green |
| 8,047,412 | B2 | | 11/2011 | Premartin et al. |
| 8,118,202 | B1 | | 2/2012 | Price |
| 8,794,493 | B2 | * | 8/2014 | Cauley ..................... B60R 9/10 224/403 |
| 8,820,811 | B1 | | 9/2014 | Hemphill et al. |
| 8,905,280 | B2 | | 12/2014 | Martin |
| 9,159,254 | B2 | | 10/2015 | Oyoung |
| 9,248,784 | B2 | | 2/2016 | Kraeuter et al. |
| 9,254,792 | B2 | * | 2/2016 | Patton ..................... B60R 11/00 |
| 9,493,123 | B2 | | 11/2016 | Martin |
| 2003/0089751 | A1 | | 5/2003 | Munoz et al. |
| 2006/0196906 | A1 | | 9/2006 | Gibson, Jr. |
| 2007/0110539 | A1 | * | 5/2007 | Klinkman ............. B60P 7/0815 410/150 |
| 2011/0068140 | A1 | * | 3/2011 | Stevens ..................... B60R 9/10 224/533 |
| 2011/0266322 | A1 | | 11/2011 | Jones |
| 2014/0117062 | A1 | * | 5/2014 | Kraeuter ................... B60P 3/40 224/403 |
| 2014/0124551 | A1 | | 5/2014 | Condon et al. |
| 2015/0060636 | A1 | * | 3/2015 | Erickson ................ B25H 1/0014 248/670 |
| 2015/0231780 | A1 | * | 8/2015 | Hirokawa ............. B25H 1/0014 224/518 |
| 2015/0329059 | A1 | * | 11/2015 | Jobe ......................... B60R 9/06 224/403 |

OTHER PUBLICATIONS

Office Action dated Mar. 4, 2019 for U.S. Appl. No. 15/298,315, filed Oct. 20, 2016.

Office Action dated Dec. 15, 2017 for U.S. Appl. No. 15/298,315, filed Oct. 20, 2016.

Office Action dated Aug. 16, 2018 for U.S. Appl. No. 15/298,315, filed Oct. 20, 2016.

* cited by examiner

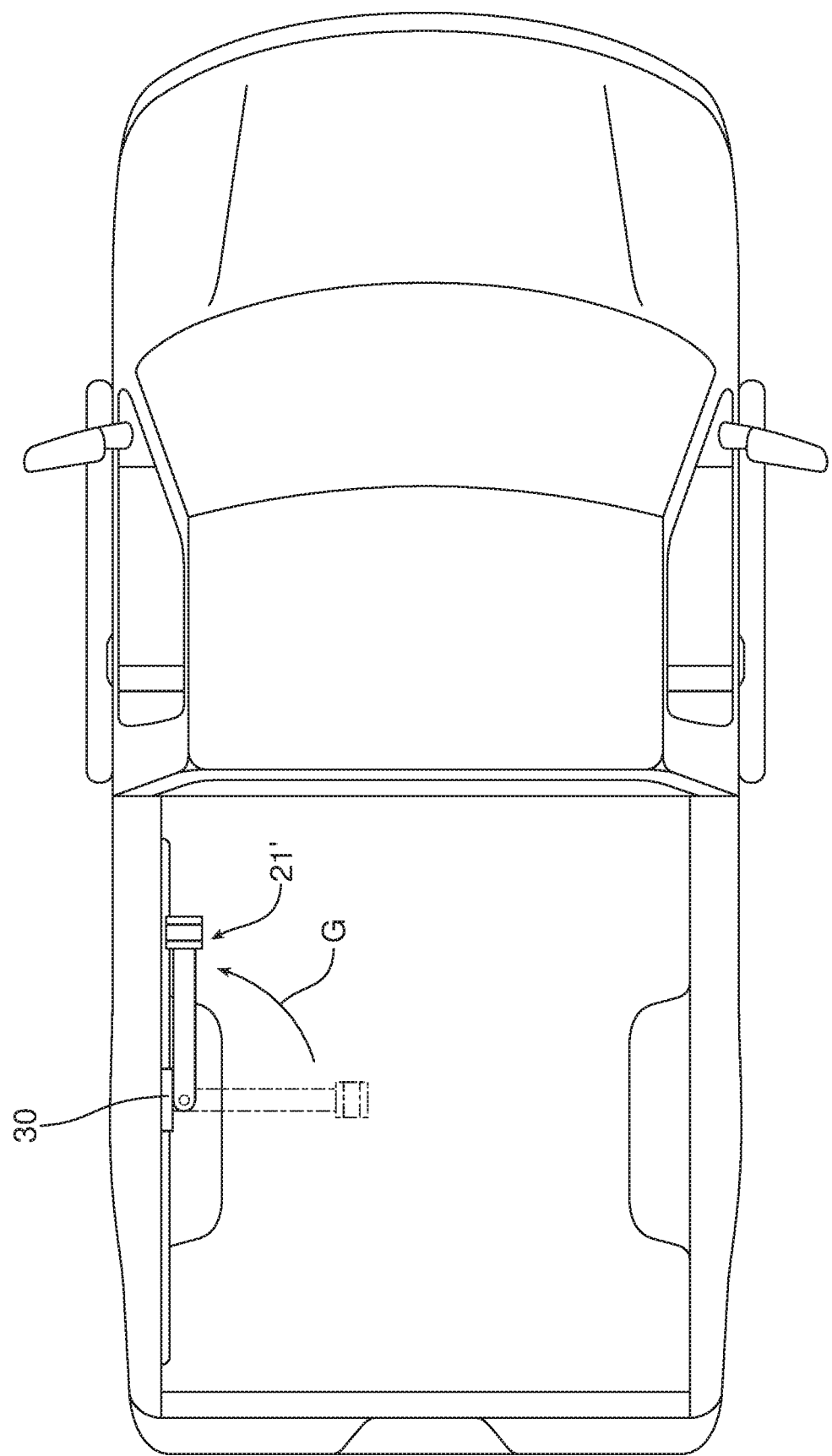

PICKUP TRUCK HAVING CARGO BED WITH SIDE MOUNTED BICYCLE RACK

TECHNICAL FIELD

This document relates generally to the motor vehicle field and, more particularly, to a pickup truck with a cargo bed having a side mounted bicycle rack.

BACKGROUND

Conventionally, when a pickup truck user desires to transport one or more bicycles, the options are to place the bicycles in the vehicle cabin, to arrange them inside of the cargo area or to provide a suitable third-party bicycle carrier. Placing the bicycle in the interior of the vehicle cabin risks soiling and/or damage to the vehicle and possibly the bicycle, and also consumes valuable passenger space. In turn, placing the bicycles in the cargo area, either fully assembled or partially disassembled, for example by removing of one or both bicycle wheels, risks allowing the bicycles to move around during transport, potentially getting damaged or causing damage to the cargo area.

Thus, a need is identified for an improved apparatus for supporting a bicycle in a vehicle and, in particular, a cargo bed of a pickup truck.

SUMMARY

In accordance with the purposes and benefits described herein, a pickup truck having a cargo bed with a side mounted bicycle rack is provided. According to one aspect of the disclosure, a rack for supporting a bicycle frame relative to a cargo bed of a pickup truck for moving in a travel direction is provided. The rack comprises a carrier having an upper surface adapted for receiving and supporting the frame of the bicycle. A guide is also provided for guiding movement of the carrier in the travel direction.

In one embodiment, the carrier comprises a first portion for slidably engaging the guide and a second portion upstanding from the first portion having the surface for supporting the bicycle frame. The carrier may further comprise a connector for connecting the carrier to the guide, the carrier being mounted for pivoting between a stowed position aligned with the travel direction and an extended position transverse to the travel direction. The second portion of the carrier may pivotally mount to the first portion for moving between an erect position for supporting the bicycle frame and a retracted position. The carrier may also include a plurality of upstanding portions, each for associating with a different bicycle.

The guide may comprise a pair of parallel rails elongated in a travel direction, and the carrier is adapted for slidably engaging the rails. The carrier may further include a cradle for receiving the bicycle frame. A strap may also be provided for holding the bicycle frame in association with the carrier.

According to a further aspect of the disclosure, a pickup truck may be adapted for transporting a bicycle having wheels and a frame in a travel direction. The truck comprises a cargo bed having sidewalls spaced in a direction transverse to the travel direction. A pair of parallel guide rails extending along one of the sidewall, and a carrier adapted for receiving and supporting the bicycle frame is further adapted for engaging the guide rails.

In one embodiment, the carrier comprises a first portion for slidably engaging the guide rails and a second upstanding portion for engaging the bicycle frame. The first portion may include a connector for connecting the carrier to the guide rails, the carrier being mounted for pivoting between a stowed position aligned with the travel direction and an extended position transverse to the travel direction. The second portion may be pivotally mounted to the first portion for moving between an erect position and a stowed position, and a plurality of second portions may be provided. The carrier may also include a cradle for engaging the bicycle frame, as well as a strap for engaging the bicycle frame.

According to a further aspect of the disclosure, a pickup truck is adapted for transporting a bicycle frame in a travel direction. A cargo bed of the pickup truck includes sidewalls spaced in a direction transverse to the travel direction. A guide extends along one sidewall of the bed. A carrier adapted for receiving and supporting the bicycle frame is further adapted for moving between a stowed position aligned with the travel direction and an extended position transverse to the travel direction.

In one embodiment, the carrier comprises a connector for connecting to the guide and a first portion pivotally mounted to the connector for extending transverse to the guide in the extended position of the carrier. The carrier may further comprise a second upstanding portion for engaging the bicycle frame. The second upstanding portion may be pivotally mounted to the first portion for moving between an erect position and a retracted position.

In the following description, there are shown and described several preferred embodiments of a side mounted bicycle rack for a cargo bed of a pickup truck. As it should be realized, the arrangement is capable of other, different embodiments and its several details are capable of modification in various, obvious aspects all without departing from the cargo bed having a side mounted bicycle rack, as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of a cargo bed having a side mounted bicycle rack and, together with the description, serve to explain certain principles thereof. In the drawing figures:

FIG. 5 illustrates the rack in a stowed position.

Reference will now be made in detail to the present preferred embodiments of a cargo bed having a side mounted bicycle rack, examples of which are illustrated in the accompanying drawing figures.

DETAILED DESCRIPTION

Figure 1:
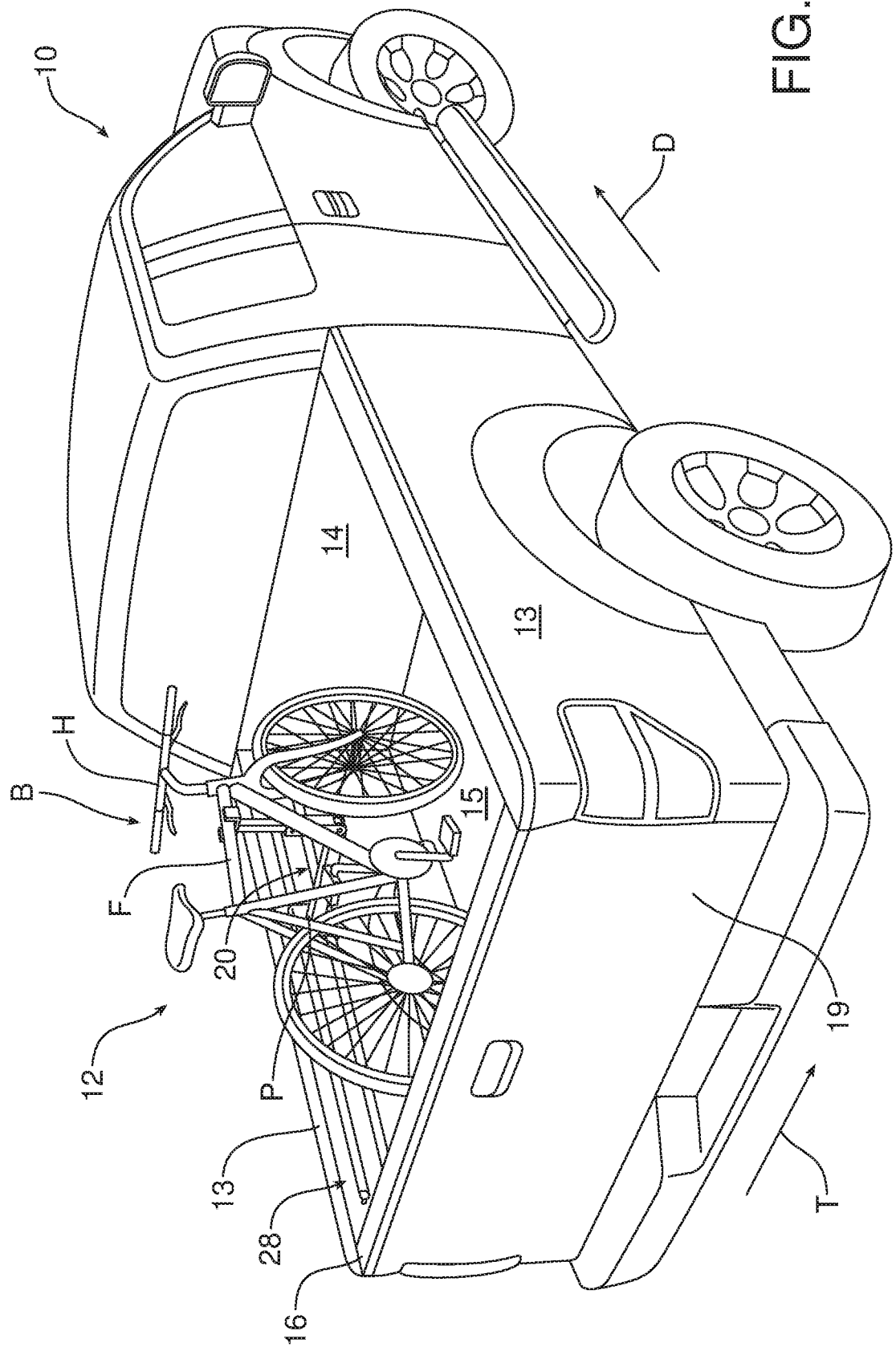
FIG. 1 is a perspective view of a cargo bed, such as for a pickup truck or like vehicle, including a side mounted bicycle.

Referring to FIG. 1, a pick-up truck 10 includes a cargo bed 12 forming the rearward portion thereof. The cargo bed 12 includes generally vertical, upright sidewalls 13 spaced apart in a direction transverse T to a travel direction D of the pickup truck 10, a front wall 14, and a floor 15. The frame of the pickup truck 10 includes a generally vertical D-pillar 16 located at the rearward end of the cargo bed 12 adjacent the pivotable tailgate 19. The tailgate 19 extends transversely above the floor 15 between the sidewalls 13 at the rearwardmost portion of the cargo bed 12. The tailgate 19 is pivotally mounted to the floor 15 and is movable between an upright closed position that is oriented perpendicularly to the floor 15 and generally opposite the front wall 14, and a lowered open position that forms an extension of the floor 15 rearwardly of the sidewalls 13 (compare FIGS. 1 and 2).

Figure 2:
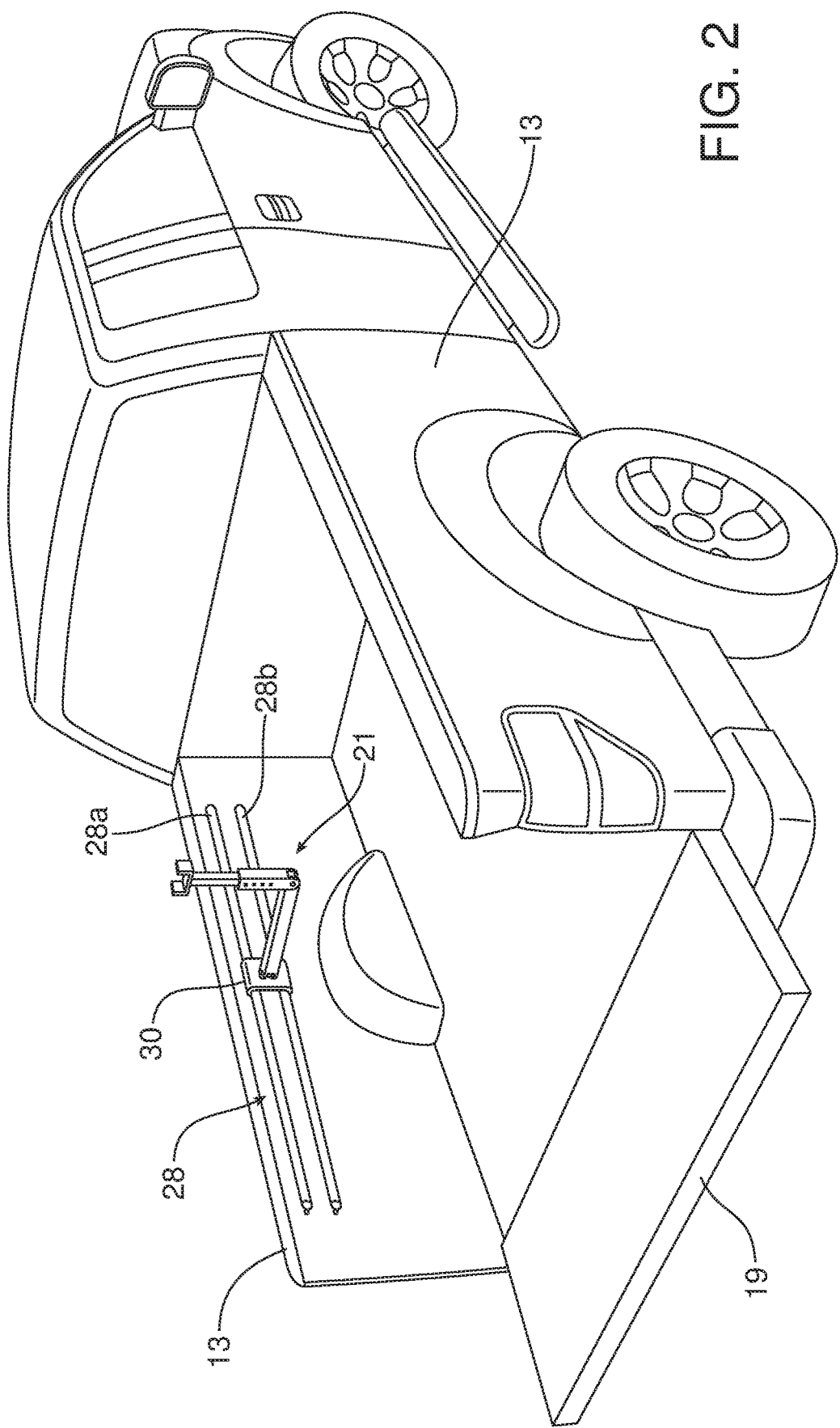
FIG. 2 is a top view of an adjustable, side mounted rack for supporting a bicycle frame in connection with a sidewall adjacent the cargo bed.
Figure 3:
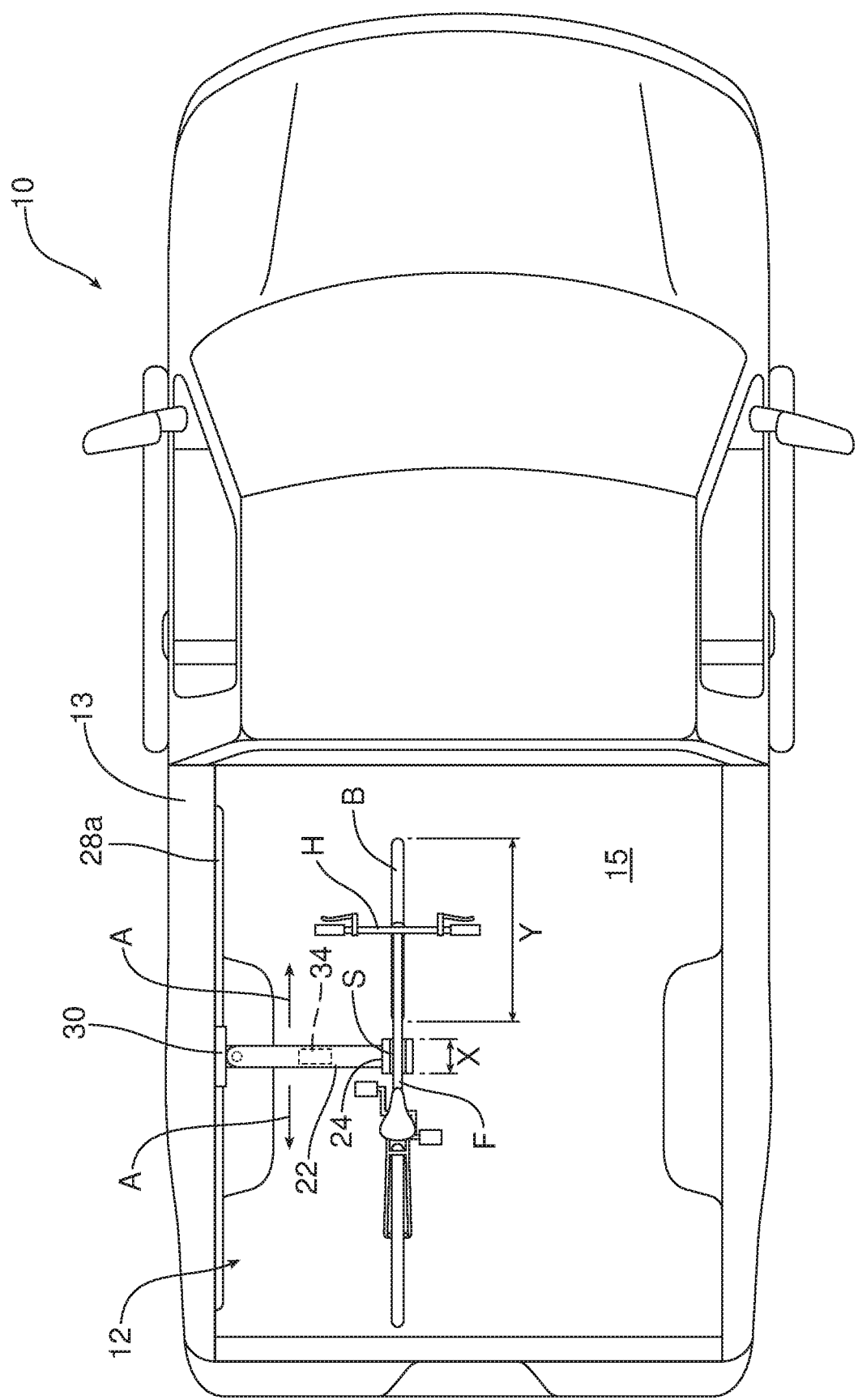
FIG. 3 is a perspective view of the carrier portion of the rack fully deployed for holding a bicycle in a cargo bed.
Figure 4:
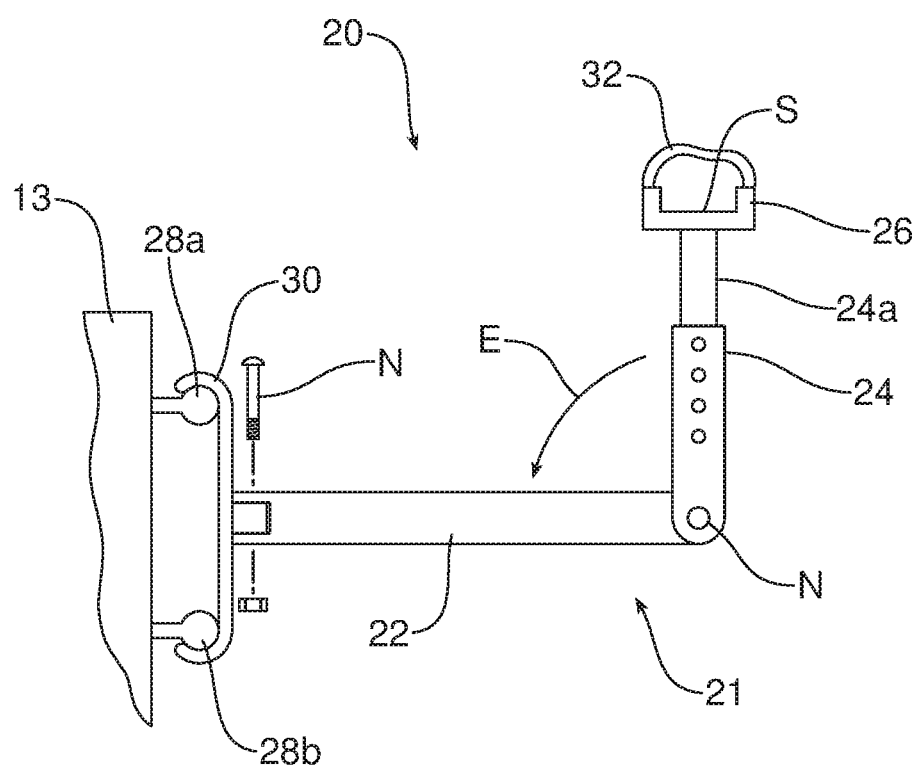
FIG. 4 is a side view of the rack in the extended or deployed position.

According to one aspect of the disclosure, and with further reference to FIGS. 2, 3, and 4, the bed 12 is provided with a rack 20 for supporting a bicycle in a stable condition during transport by the pickup truck 10. In order to support a bicycle B, such as by the frame F, the rack may include a carrier 21 for mounting to one sidewall 13 of the bed 12. As perhaps best understood with reference to FIG. 2, the carrier 21 may comprise a first, generally horizontal portion 22 connected to a second, upstanding or vertical portion 24. The vertical portion 24 may include an upper surface S for engaging and supporting the bicycle frame F, along with an optional cradle 26. As can be appreciated from FIG. 3, the carrier 21 (and in particular surface S) has a width X in the travel direction D that is less than the space between the seat post P and handlebars H of the bicycle B, and also less than the width Y of either wheel W of the bicycle B in travel direction.

The carrier 21 may be provided so as to be adjustable along the sidewall 13. In one embodiment, this is achieved by providing a guide 28 having a pair of guide rails 28a, 28b extending in a parallel fashion (with parallel including deviations from perfect parallel alignment, as long as the desired operation may be achieved) along the sidewall 13. A corresponding connector 30 may be associated with the carrier 21, such as by connection with one end of the horizontal portion 22. As indicated in FIG. 3, the connector 30 may be generally C-shaped and adapted to engage both rails 28a, 28b simultaneously in order to provide for sliding movement in alignment with the travel direction D. However, an alternative arrangement could be used in which the end of the horizontal portion 22 is captured within a channel within a single rail serving as guide 28. Likewise, the connector 30 may be supported by a single, wide rail forming the guide 28 instead of two parallel rails 28a, 28b.

With reference to FIGS. 4 and 5, it can be understood that the carrier 21 may optionally be moved between an erect or deployed position for supporting the bicycle and a stowed position, while remaining connected to the guide 28 (see arrow G in FIG. 5, and note stowed position of carrier 21'). To facilitate storage, the horizontal portion 22 of the carrier 21 may be pivotally connected to the connector 30 (such as by a pivot pin N, which may comprise a nut and bolt combination), such that the horizontal portion is aligned and generally parallel with the guide 28. Likewise, the vertical portion 24 may also pivot about a pivot pin N (which may comprise a bolt and nut in combination) at the opposite end of the horizontal portion 22 to be collapsed for storage (note arrow E in FIG. 4), or moved to an erect position for supporting the bicycle frame F.

In use, the carrier 21 may deployed from a stowed position and to the erected position shown in FIG. 2. A bicycle B may then be associated with the carrier 21, such as by positioning the frame F in the cradle 26 and using an optional strap 32 (FIG. 4) to secure the arrangement. Either prior to or after establishing the connection, the connector 30 may be slid along the guide 28, such as rails 28a, 28b, to a proper or desired position for holding the bicycle B in the cargo bed 12. A lock, such as a bolt or pin (not shown) may be used to fix the position of the connector 30 along the guide, or the engagement resulting from mating surfaces with a high coefficient of friction (e.g., rubber on painted metal) may be sufficient to avoid undesired movement in the travel direction D.

Optionally, the vertical portion 24 of the carrier 21 may be made height adjustable. This may be done, for example, by providing it with a telescoping insert or tube (see tube 24a in FIG. 4). In this manner, the relative height of the cradle 26 may be controlled to either raise or lower the bicycle B (which may contact the floor 15, but may also be suspended above it, depending on the relative dimensions).

It can also be appreciated that the carrier 21 may be adapted for supporting multiple bicycles, such as by extending the horizontal portion 22 and providing an additional vertical portion 34, as indicated in phantom view in FIG. 3. Racks 20 may also be positioned along both sidewalls 13 of the cargo bed 12, provided sufficient space exists in a given arrangement. The racks 20 may be fully removable to allow for installation or removal, or may be provided an integral part of the truck 10 at the time of manufacture.

In summary, a pickup truck 10 with a cargo bed 12 having a side mounted bicycle carrier 21 is provided. The carrier 21 may be adjustable within the space of the bed 12, such as by sliding to and fro in a travel direction D, to accommodate a variety of sizes or shapes of bicycles. Stowage of the carrier 21 in a compact configuration may also be possible to avoid having it take up valuable space in the cargo bed 12 when not in use. The carrier 21 may also be adapted to provide support for multiple bicycles within the cargo bed 12 in an organized manner.

The foregoing description has been presented for purposes of illustration. It is not intended to be exhaustive or to limit the embodiments to the precise form disclosed. Obvious modifications and variations are possible in light of the above teachings. For instance, the rack 20 may be used with other vehicles including a cargo area similar to that of a cargo bed 12 of a pickup truck. All such modifications and variations are within the scope of the appended claims when interpreted in accordance with the breadth to which they are fairly, legally, and equitably entitled.

What is claimed:

1. A rack for supporting a bicycle frame relative to a cargo bed of a pickup truck for moving in a travel direction, comprising:
   a carrier having an L-shape with an upstanding telescoping portion for supporting the frame of the bicycle; and
   a guide for guiding movement of the carrier in the travel direction, the carrier having a lower portion slidably engaging the guide wherein the carrier comprises a connector for connecting the carrier to the guide for relative movement, the carrier being mounted to the connector for pivoting between a stowed position aligned with the travel direction and an extended position transverse to the travel direction and wherein the upstanding telescoping portion is pivotally mounted to the lower portion for moving between an erect position for supporting the bicycle frame and a retracted position for assuming the stowed position of the carrier.

2. The rack of claim 1, wherein the guide comprises a pair of parallel rails elongated in a travel direction, and the carrier is adapted for slidably engaging the parallel rails to move to and fro in the travel direction.

3. The rack of claim 1, wherein the carrier comprises a plurality of upstanding portions for engaging the bicycle frame.

4. The rack of claim 1, wherein the carrier includes a cradle for receiving the bicycle frame.

5. The rack of claim 1, wherein the carrier includes a strap for holding the bicycle frame in association with the carrier.

6. A pickup truck including the rack of claim 1.

7. A pickup truck adapted for transporting a bicycle having wheels and a frame in a travel direction, comprising:
   a cargo bed having sidewalls spaced in a direction transverse to the travel direction;
   a pair of parallel guide rails along one of the sidewalls; and
   a carrier adapted for receiving and supporting the bicycle frame, the carrier adapted for moving along the guide rails in the travel direction wherein the carrier includes (a) a first portion for slidably engaging the guide rails, (b) a second upstanding portion for engaging the bicycle frame and (c) a connector for connecting the carrier to the guide rails, the carrier being mounted for pivoting from a stowed position aligned with the travel direction to an extended position transverse to the travel direction and wherein the second portion is pivotally mounted to the first portion for moving from an erect position for supporting the bicycle frame to a retracted position for assuming the stowed position of the carrier.

8. The truck of claim 7, wherein the carrier comprises a first portion for extending from adjacent one sidewall into the cargo bed in a direction transverse to the travel direction and a plurality of upstanding portions adapted for engaging the bicycle frame.

9. The truck of claim 7, wherein the carrier includes a cradle for engaging the bicycle frame.

10. The truck of claim 7, wherein the carrier includes a strap for engaging the bicycle frame.

11. A pickup truck adapted for transporting a bicycle frame in a travel direction, comprising:
    a cargo bed having sidewalls spaced in a direction transverse to the travel direction;
    a guide extending along one sidewall; and
    a carrier connected to the guide, the carrier adapted for moving about a vertical axis from a stowed position aligned with the travel direction to an extended position transverse to the travel direction for supporting the bicycle frame while connected to the guide wherein the carrier comprises a connector for connecting to the guide, a first portion pivotally mounted to the connector for extending transverse to the guide in the extended position of the carrier, and a second upstanding and telescoping portion for engaging the bicycle frame.

12. The truck of claim 11, wherein the second upstanding portion is pivotally mounted to the first portion for moving between an erect position and a retracted position.

\* \* \* \* \*